United States Patent [19]
Yamamoto et al.

[11] Patent Number: 5,091,901
[45] Date of Patent: Feb. 25, 1992

[54] DISC CARTRIDGE WITH DUAL IDENTIFICATION ELEMENTS

[75] Inventors: Hiroshi Yamamoto; Shizuo Arai, both of Kanagawa, Japan

[73] Assignee: Sony Corporation, Tokyo, Japan

[21] Appl. No.: 495,635

[22] Filed: Mar. 19, 1990

[30] Foreign Application Priority Data

Apr. 6, 1989 [JP] Japan .................. 1-087726

[51] Int. Cl.[5] .................. G11B 7/26; G11B 15/04; G11B 23/02
[52] U.S. Cl. .................. 369/291; 360/133; 360/132; 360/60; 206/309; 206/444
[58] Field of Search .............. 369/272, 289, 291, 292; 360/131, 133, 60

[56] References Cited

U.S. PATENT DOCUMENTS

| | | | |
|---|---|---|---|
| 4,785,368 | 11/1988 | Tanaka et al. | 360/133 |
| 4,860,127 | 8/1989 | Takahashi et al. | 360/60 |
| 4,995,029 | 2/1991 | Kobayashi et al. | 369/291 |

FOREIGN PATENT DOCUMENTS 0139146 5/1985 European Pat. Off. .
0339651 11/1989 European Pat. Off. .

*Primary Examiner*—Stuart S. Levy
*Assistant Examiner*—Kenneth B. Wells
*Attorney, Agent, or Firm*—Lewis H. Eslinger; Jay H. Maioli

[57] ABSTRACT

A disc cartridge having a cartridge body accommodating therein a record medium so that the record medium can be recorded and/or reproduced in the accommodated state, a first identifying device movably provided in the cartridge body so as to be switched from the outside so that it can close partly or wholly a rectangular window aperture formed through the cartridge body, and a second identifying device provided in the cartridge body in a half-secured condition so as to close a part of another rectangular window aperture formed through the cartridge body and which cannot be switched from the outside, wherein the first and second identifing devices indicate the kind of optical disc and data necessary for recording on and/or reproducing from the optical disc incorporated.

6 Claims, 5 Drawing Sheets

FIG. 6A

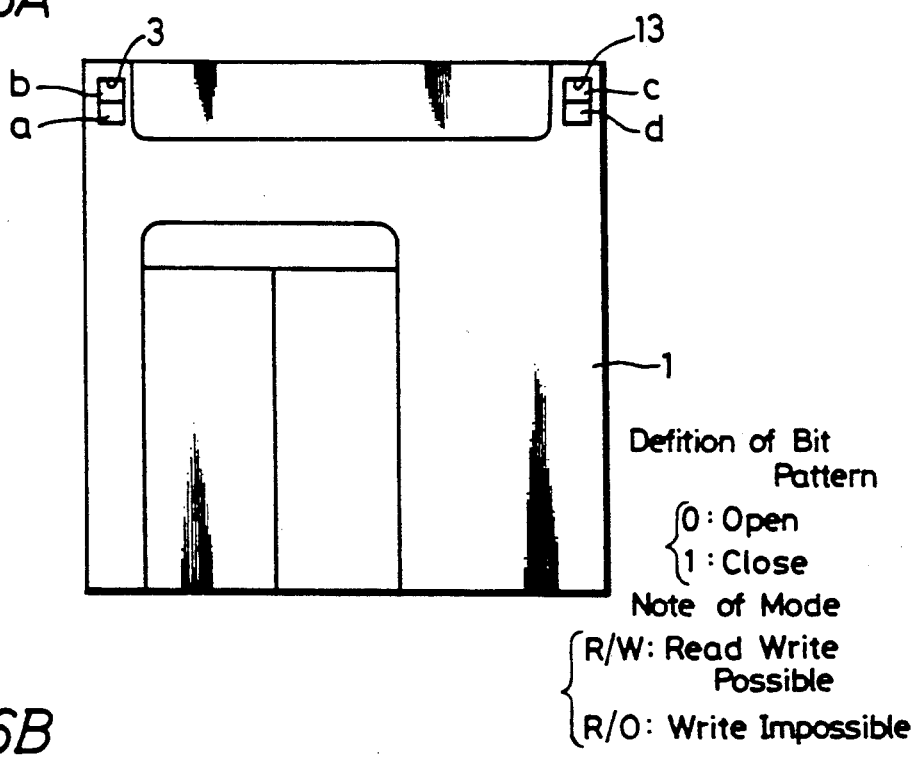

Defition of Bit
Pattern
{ 0 : Open
{ 1 : Close
Note of Mode
{ R/W: Read Write Possible
{ R/O: Write Impossible

FIG. 6B

| d | c | b | a | Mode | | |
|---|---|---|---|------|---|---|
| 0 | 0 | 0 | 0 | Not Defined (Without Disc) | | |
| 0 | 0 | 0 | 1 | Maintenance Mode (Used by Manufacturrer) | Adjustment Diagnosis Others | |
| 0 | 0 | 1 | 0 | | | |
| 0 | 0 | 1 | 1 | | | |
| 0 | 1 | 0 | 0 | | | |
| 0 | 1 | 0 | 1 | | | |
| 0 | 1 | 1 | 0 | | | |
| 0 | 1 | 1 | 1 | Lens Cleaner Disc | | |
| 1 | 0 | 0 | 0 | O-ROM | 512 Bytes/Sector | High Reflectivity |
| 1 | 0 | 0 | 1 | MO R/W | 512 Bytes/Sector | |
| 1 | 0 | 1 | 0 | MO R/O | 512 Bytes/Sector | |
| 1 | 0 | 1 | 1 | O-ROM | 512 Bytes/Sector | Low Reflectivity |
| 1 | 1 | 0 | 0 | O-ROM | 1024 Bytes/Sector | High Reflectivity |
| 1 | 1 | 0 | 1 | MO R/W | 1024 Bytes/Sector | |
| 1 | 1 | 1 | 0 | MO R/O | 1024 Bytes/Sector | |
| 1 | 1 | 1 | 1 | O-ROM | 1024 Bytes/Sector | Low Reflectivity |

DISC CARTRIDGE WITH DUAL IDENTIFICATION ELEMENTS

BACKGROUND OF THE INVENTION

1. Field of the Invention

The present invention relates generally to disc cartridges and, more particularly, is directed to a disc cartridge in which a disc-shaped record medium such as a magneto-optical disc or the like is accommodated in the state that the record medium can be recorded and/or reproduced.

2. Description of the Prior Art

Recently, a magneto-optical disc (hereinafter referred to as an MO disc) and an optical read-only memory (hereinafter referred to as an O-ROM disc) are available as an optical disc of 90 mm-type. These optical discs are accommodated in a disc cartridge and can be recorded and/or reproduced by a head apparatus through an openable and closable opening portion by a shutter which is formed on the disc cartridge.

Let us explain a prior-art disc cartridge which incorporates therein a 90 mm optical disc according to the ISO standard. FIGS. 1 to 3 show an example of such a disc cartridge.

As shown in FIGS. 1 to 3, there is shown a cartridge body 1 which is formed of an upper cartridge half 1a and a lower cartridge half 1b. A window aperture 2 is formed through the upper half 1a at its lower corner, whereas a rectangular window aperture 3 is formed through the lower cartridge half 1b. This rectangular window aperture 3 is formed of a window aperture portion 3a corresponding to the window aperture 2 and a window aperture portion 3b which is not corresponding to the window aperture 2. This rectangular aperture 3 is twice as long as the window aperture 2 in the length direction. A closing member 4 the size of which is ½ of that of the rectangular aperture 3 is movably engaged with this rectangular aperture 3 between the one half portion 3a provided as the corresponding portion and the other half portion 3b provided as the non-corresponding portion, thereby the closing member 4 being changed-over from the outside into the window aperture portion 3a or 3b serving as identification means.

The identification of the optical disc incorporated in this disc cartridge is performed by detecting the switching position of the closing member 4 engaged with the rectangular opening portion 3. The position of the closing member 4 is mechanically and optically detected.

From a mechanical standpoint, as shown in FIG. 2A, a recording and/or reproducing apparatus (not shown) is provided with a push-type switch 5 having a pair of operation members 5a and 5b which are corresponding to the one half portion 3a and the other half portion 3b of the rectangular opening portion 3 of the cartridge body 1. Accordingly, under the condition that the disc cartridge is incorporated into the recording and/or reproducing apparatus, the closing member 4 pushes the operation member 5a or 5b (in FIG. 2A, the operation member 5b being pushed) thereby the position of the closing member 4 being detected mechanically.

From an optical standpoint, as shown in FIG. 2B, the recording and/or reproducing apparatus is provided with a light source 6 such as a light emitting diode (LED), lamp or the like corresponding to the window aperture 2 of upper half 1a of the disc cartridge body 1, whereas in the recording and/or reproducing apparatus photo detectors 7a and 7b are respectively provided in facing relation to the one half portion 3a and the other half portion 3b of the rectangular window aperture 3 formed at the rear surface side or the lower cartridge half 1b. Under the condition that the disc cartridge is loaded onto the recording and/or reproducing apparatus, the closing member 4 is opposed to the photo detector 7a or 7b (photo detector 7b in FIG. 2B) so that the light emitted from the light source 6 can not be received by the photo detector 7b, thereby the position of the closing member 4 is detected.

When the closing member 4 is removed from the rectangular window aperture 3 of the cartridge body 1, the rectangular window aperture 3 is opened so that the position of the closing member 4 can neither be detected mechanically nor optically.

As described above, in this disc cartridge, different pre-determined information can be obtained on the basis of the positions of the closing member 4, i.e., as shown in FIGS. 6A and 6B. Three modes of the closing member 4 relative to the rectangular opening 3 of the cartridge body 1 are used to identify the kinds of discs incorporated in the disc cartridge. The identification is performed with respect to the existence or absence of the write-protect of the MO disc and the kind of the MO disc.

As described above, in the prior-art disc cartridge, the three kinds of identification such as the existence or absence of the write protect mechanism and the kinds of discs such as the O-ROM disc or MO-disc can be performed by the appearance of the disc cartridge. However, the prior-art disc cartridge cannot perform other necessary identification such as whether a reflecting layer is a layer having high reflectivity formed of an aluminum film or the like in the case of the O-ROM disc, whether the reflecting layer is a layer having low reflectivity corresponding to the MO-disc and whether the byte number per sector is 512 $^{BYTE}$/Sector or 1024 $^{BYTE}$/Sector or the like.

Accordingly, in order to determine whether the reflectivity of the O-ROM disc is high or low, a sample laser light must be irradiated on a particular portion of the disc and the magnitude of amount of the reflected-back light must be detected. In the above-mentioned operation, when the MO disc is accommodated into the disc cartridge, there is then the risk that the data is destroyed. Further, if the identification is performed at the unit of byte number per sector, data of particular zone of the disc is read-out.

As described above, data, which can not be read out from the external appearance of the disc cartridge, is determined by an electrical circuit and hardware in the recording and/or reproducing apparatus so that the burden on the electrical circuit and the hardware becomes considerably larger.

OBJECTS AND SUMMARY OF THE INVENTION

Therefore, it is an object of the present invention to provide an improved disc cartridge which can eliminate the defects encountered with the prior-art.

It is another object of the present invention to provide a disc cartridge in which various information such as the kind and function of a record medium incorporated in the disc cartridge can be identified from the external appearance.

It is a further object of the present invention to provide a disc cartridge in which the burden on an electrical circuit within a recording and/or reproducing apparatus and the burden on the hardware can be reduced.

It is still another object of the present invention to provide a disc cartridge in which a mis-operation upon use can be avoided and reliability can be improved.

According to an aspect of the present invention, a disc cartridge is comprised of a cartridge body accommodating therein a disc-shaped record medium so that the disc-shaped record medium can be recorded and/or reproduced in that accommodated condition, a first identifying device provided in the cartridge body so that it can be switched from the outside, and a second identifying device provided in the cartridge body so that it cannot be switched from the outside, wherein the kind of a disc incorporated in the disc cartridge can be indicated by the first and second identifying devices.

The above, and other objects, features and advantages of the present invention will become apparent in the following detailed description of the preferred embodiment when read in conjunction with the accompanying drawings in which like reference numerals are used to identify the same or similar parts in the several views.

BRIEF DESCRIPTION OF THE DRAWINGS

FIG. 6A shows the settings of the disc cartridge used to create the bit patterns according to the present invention.

FIG. 6B is a table showing the meaning of the bit patterns according to the present invention.

DETAILED DESCRIPTION OF THE PREFERRED EMBODIMENT

Figure 1A:
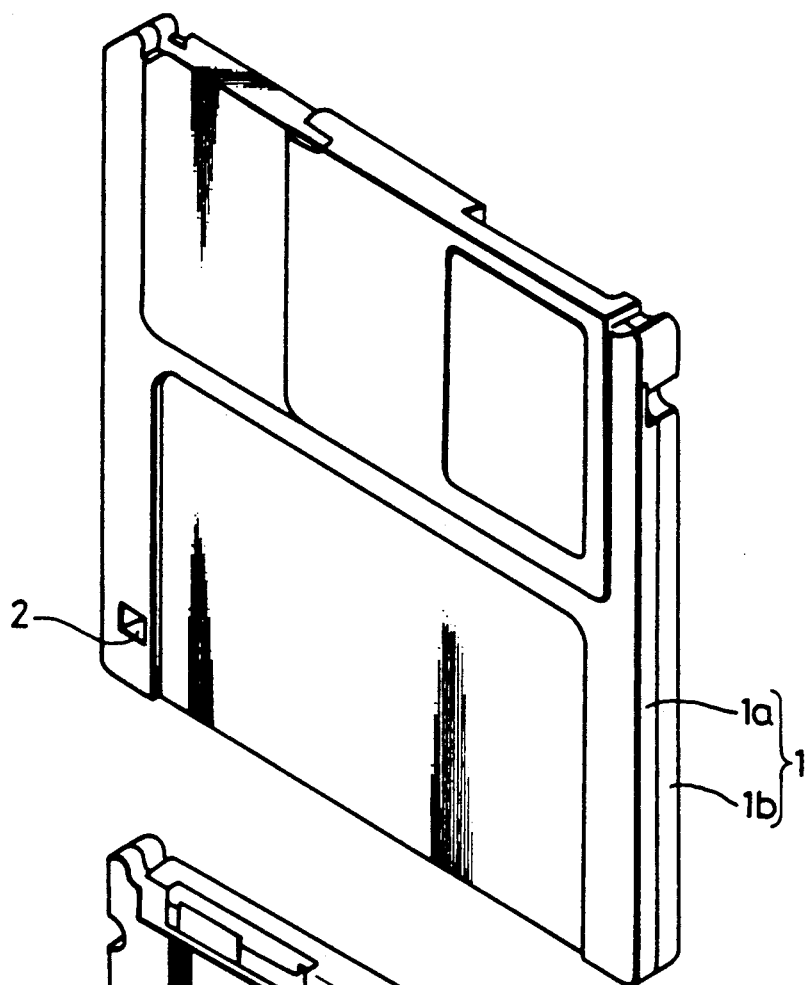
FIGS. 1A and 1B are respectively perspective views showing an example of a prior-art disc cartridge.
Figure 1B:
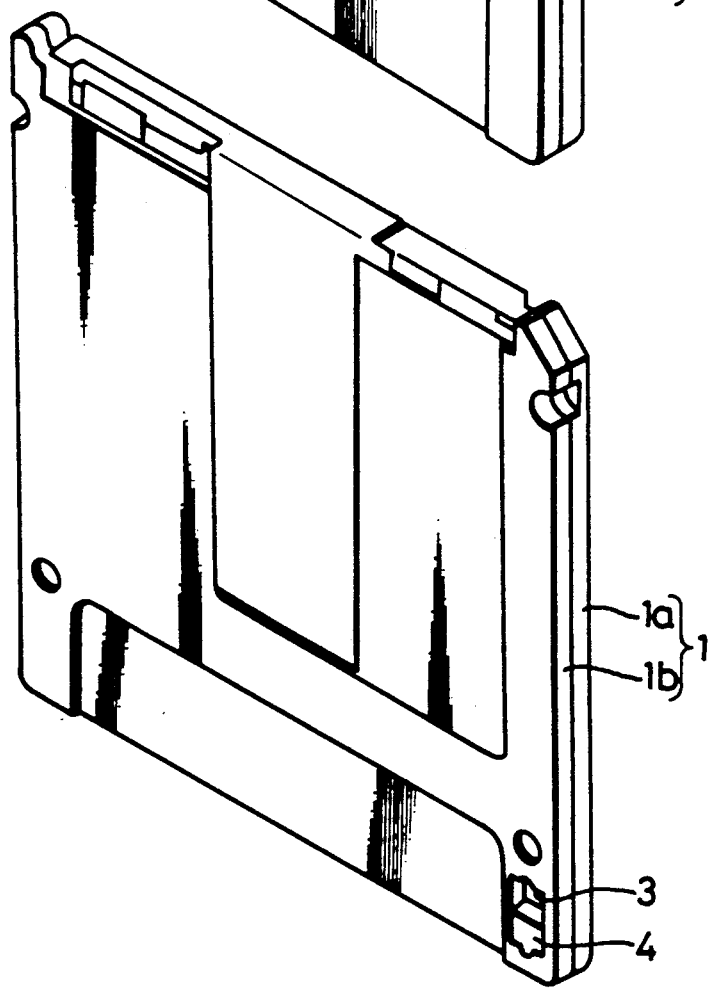
Figure 2A:
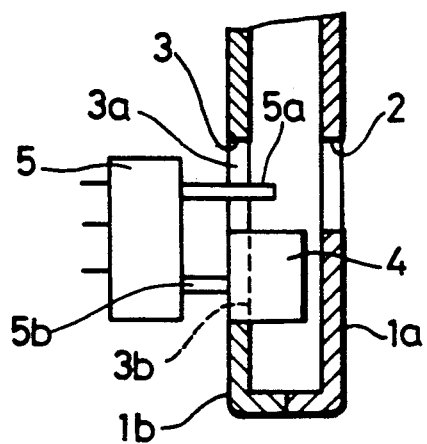
FIGS. 2A and 2B are sectional fragmentary diagrammatic views used to explain the above-described prior-art disc cartridge shown in FIGS. 1A and 1B.
Figure 2B:
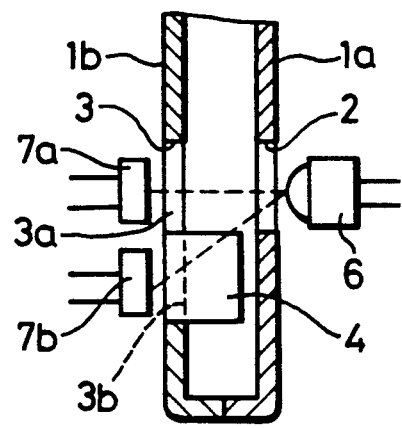
Figure 4:
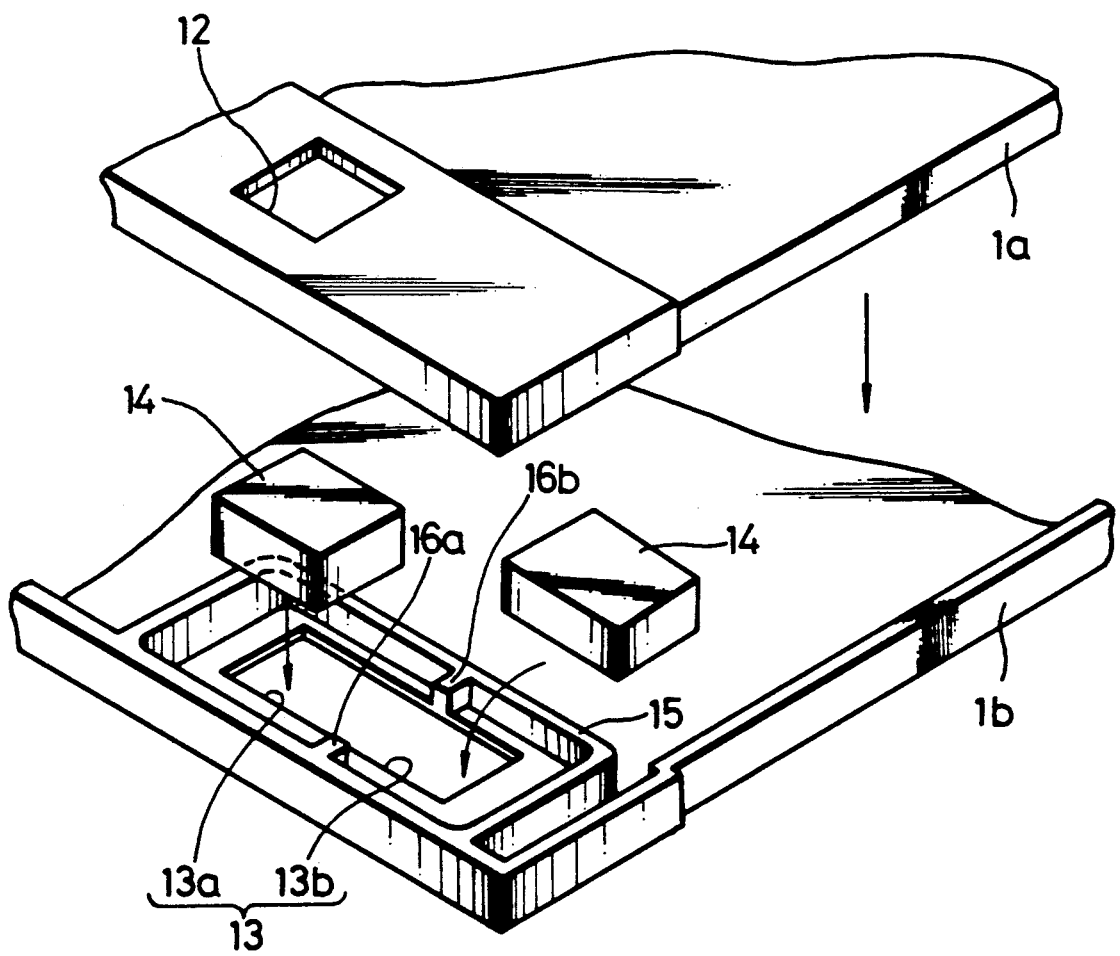
FIG. 4 is a perspective view of an embodiment of a disc cartridge according to the present invention and illustrating the same in a partly-exploded fashion.
Figure 5A:
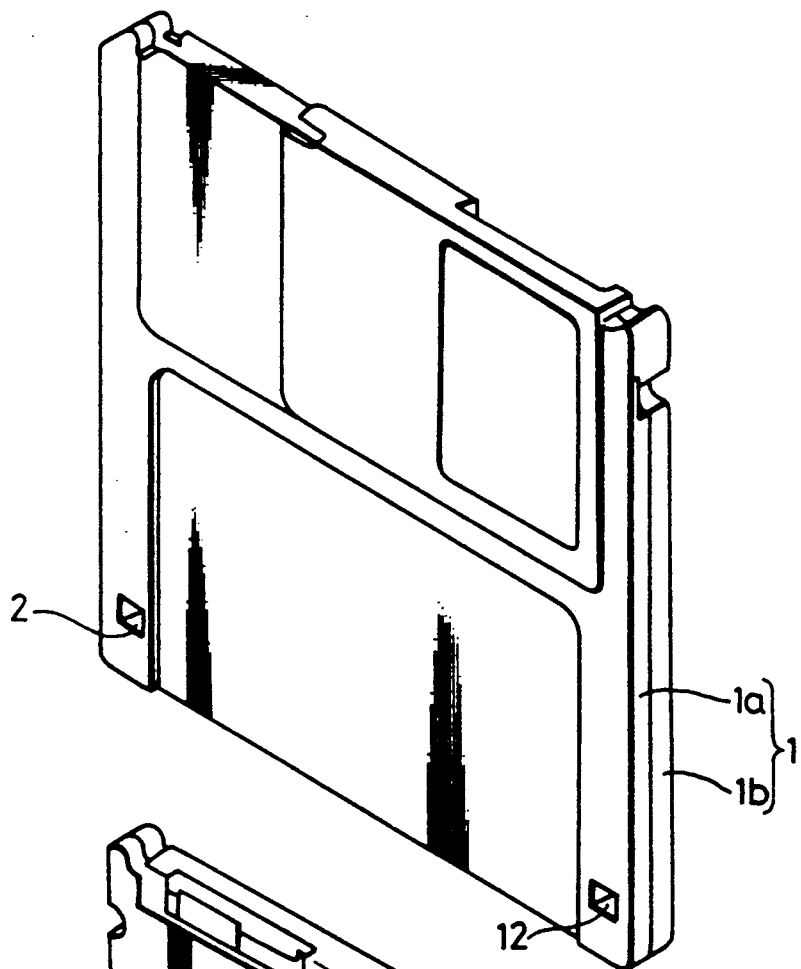
FIGS. 5A and 5B are perspective views of the embodiment of the disc cartridge of the present invention.
Figure 5B:
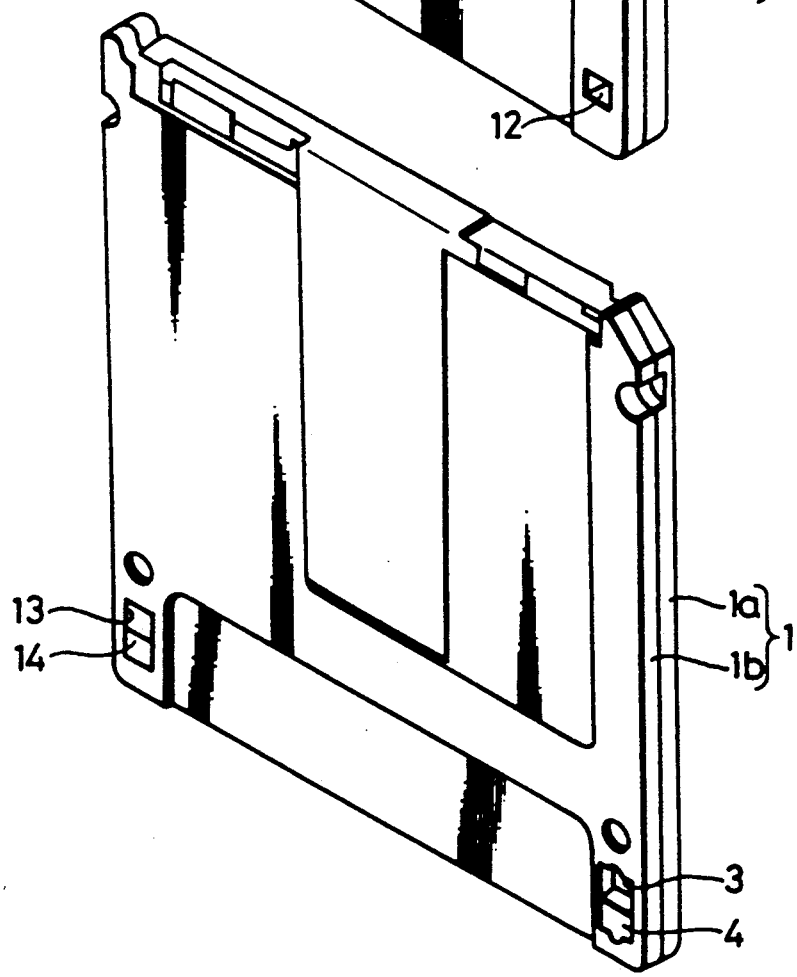

An embodiment of a disc cartridge according to the present invention will hereinafter be described in detail with reference to FIGS. 4 to 6. In FIGS. 4 to 6, like parts corresponding to those of FIGS. 1 to 3 are marked with the same references and therefore need not be described in detail.

Also in this embodiment, similarly to the prior art, the window aperture 2 is formed on the upper cartridge half 1a of the cartridge body 1 at its corner portion whereas the rectangular window aperture 3 twice as large as the window aperture 2 in the length direction thereof is formed on the lower cartridge half 1b side. The closing member 4 is movably engaged with the rectangular window aperture 3 so that the closing member 4 can be moved between the one half portion 3a and the other half portion 3b of the rectangular opening portion by the operation from the outside, thereby forming identifying means (first identifying means in this embodiment).

Figures 3A, 3B, 3C:
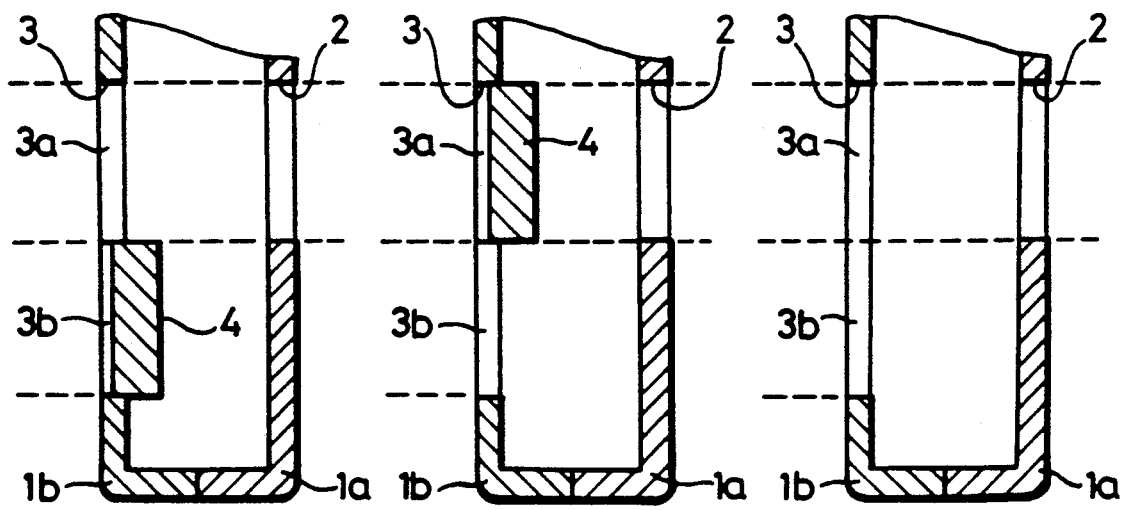
FIGS. 3A to 3C are sectional diagrammatic views used to explain an operation of the prior-art disc cartridge of FIGS. 1A and 1B.

When one closing member 4 is utilized by this first identifying means as shown in FIG. 3, however, the bit patterns shown in FIG. 6B which will be described later, cannot be formed. In order to remove this defect, a pair of closing members 4 are provided in the cartridge body 1 so that they can be changed-over independently. Alternatively, a first closing member having a body having an openable/closeable portion and being a close size of the rectangular window aperture 3 is attached to the cartridge body 1 so that it can be freely moved and a second closing member which opens and/or closes the above-described openable/closeable portion is movably attached to the first closing member. Accordingly, this closing member has a double-structure so that they can be changed-over properly upon use.

In this embodiment, second identifying means is provided at the other corner portion of the cartridge body 1, i.e., at the symmetrical position of the first identifying means. This second identifying means is constructed as follows.

As shown in FIGS. 4 and 5, a window aperture 12 is formed through the upper cartridge half 1a and a rectangular window aperture 13 of a size substantially twice the window aperture 12 in the length direction, i.e., formed of one half portion 13a corresponding to the window aperture 12 and the other half portion 13b which is not corresponding to the window aperture 12 is formed on the lower cartridge half 1b. A closing frame member 14, which can close about one half portion of the rectangular aperture 13 or one half portion 13a provided as the corresponding portion and the other half portion 13b provided as the non-corresponding portion is arranged on the inner surface side of the rectangular window aperture 13. These closing frame members 14 are arranged on the inner surface side of the rectangular window aperture 13 in a loosely retained condition as follows.

A frame wall 15 surrounding the peripheral edge of the rectangular window aperture 13 at a predetermined spacing is formed on the inner surface of the lower cartridge half 1b, and engaging protrusions 16a, 16b are inwardly, protrusively formed on the central portions of the two sides of the frame wall 15 in the longitudinal direction, whereby a closing frame member 14 is engaged under pressure into each of the half spacing portions surrounded by the frame wall 15 and the engaging protrusions 16a, 16b. When the closing frame members 14 are engaged with each of the half portions of the frame wall 15, one half portion 13a and the other half portion 13b of the rectangular opening portion 13 are closed respectively.

Detecting means is provided on the recording and/or reproducing apparatus in association with the second identifying means constructed as above. This detecting means may be mechanical means or optical means similarly to that described before.

The disc cartridge of this embodiment constructed as described above is provided with the second identifying means in addition to the identifying means of the prior-art. When the two identifying means are used in the combined state, various information can be indicated. When the disc-shaped record medium accommodated in this disc cartridge is an optical disc or magneto-optical disc, in addition to the identification of the existence or absence of the write protect mechanism of the MO-disc and the identification whether the disc is the O-ROM disc or the MO-disc, it becomes possible to identify whether the reflectivity of the O-ROM is high or low, the byte number per sector and so on.

More specifically, as shown in FIG. 6A, assuming that a is the one half portion 3a of the rectangular window aperture 3, b is the other one half portion 3b of the rectangular window aperture 3 provided as the first identifying means, c is the one half portion 13a of the rectangular window aperture 13 and d the other one half portion 13b of the rectangular window aperture 13 provided as the second identifying means, then the combination of removing or moving the closing member 4 and the closing frame members 14 provides information which are various kinds of bit patterns as shown in FIG. 6B. Therefore, the recording and/or reproducing apparatus detects the conditions of the thus formed first and second identifying means by the switch such as an electrical, mechanical or optical detecting means provided within the recording and/or reproducing apparatus and carries out the proper recording and/or reproduction by switching the setting of laser power of photo pickup head or the like on the basis of the detected output from the detecting means.

Further, the frame closing member 14 in the second identifying means is affixed within the cartridge body 1 so that, when it is delivered, the frame closing member 14 is placed in the predetermined condition. Accordingly, the user is inhibited from operating the frame closing member 14 freely with ease unlike the closing member 4 of the first identifying means. Thus, the user is permitted to operate only the first identifying means.

As set forth above, according to the present invention, since various information such as the kinds and functions of disc-shaped record medium accommodated in the disc cartridge can be identified from the outside appearance of the disc cartridge, the burden on the electrical circuit and the hardware of the recording and/or reproducing apparatus can be reduced, and a mis-operation can be prevented, thereby reliability is increased considerably.

Having described a preferred embodiment of the invention with reference to the accompanying drawings, it is to be understood that the invention is not limited to that precise embodiment and that various changes and modifications could be effected by one skilled in the art without departing from the spirit or scope of the novel concepts of the invention as defined in the appended claims.

We claim as our invention:

1. A disc cartridge comprising:
   (a) a cartridge body accommodating therein a disc-shaped record medium selected from different kinds of disc-shaped record media that can be recorded on and/or reproduced from in that accommodated condition;
   (b) first identifying means provided in said cartridge body so that it can be switched between different identifying positions from outside said cartridge body; and
   (c) second identifying means provided in said cartridge body and arranged therein so as not to be readily switched by a user between different identifying positions from outside said cartridge body, wherein information about the disc accommodated in said disc cartridge is indicated by said first and second identifying means.

2. A disc cartridge according to claim 1, wherein said first and second identifying means indicates data necessary for recording on and/or reproducing from a record medium accommodated in said disc cartridge.

3. A disc cartridge according to claim 1, wherein at least one of said first and second identifying means indicates that a recording is not to be made on the disc accommodated in said disc cartridge.

4. A disc cartridge according to claim 1, wherein at least one of said first and second identifying means indicates a recording capacity of the accommodated record medium measured in minimum recording units.

5. A disc cartridge according to claim 1, wherein said first identifying means includes a closing member which is movably provided in said cartridge body so that it can partly or wholly close a rectangular window aperture formed through said cartridge body.

6. A disc cartridge according to claim 5, wherein said second identifying means includes a closing frame member retained from movement within said cartridge body and arranged so that said closing frame member closes at least one portion of another rectangular window aperture formed through said cartridge body.

* * * * *